US012580337B2

(12) United States Patent
Wang et al.

(10) Patent No.: US 12,580,337 B2
(45) Date of Patent: Mar. 17, 2026

(54) ELASTIC TERMINAL FERRULE, TERMINAL ASSEMBLY, AND CHARGING SEAT

(71) Applicants: Tyco Electronics (Suzhou) Ltd., Suzhou City (CN); Tyco Electronics Technology (SIP) Ltd., Suzhou (CN); Tyco Electronics (Shanghai) Co., Ltd., Shanghai (CN)

(72) Inventors: Yun (Steven) Wang, Suzhou (CN); Jianwen (Gerry) Zhang, Suzhou (CN); Weidong Zhang, Shanghai (CN)

(73) Assignees: Tyco Electronics (Suzhou) Ltd., Suzhou City (CN); Tyco Electronics (Shanghai) Co., Ltd., Shanghai (CN); Tyco Electronics Technology (SIP) Co., Ltd., Suzhou (CN)

( * ) Notice: Subject to any disclaimer, the term of this patent is extended or adjusted under 35 U.S.C. 154(b) by 369 days.

(21) Appl. No.: 18/201,467

(22) Filed: May 24, 2023

(65) Prior Publication Data

US 2023/0387620 A1 Nov. 30, 2023

(30) Foreign Application Priority Data

May 24, 2022 (CN) ......................... 202221257944.3

(51) Int. Cl.
*H01R 13/11* (2006.01)
*H01R 13/18* (2006.01)

(52) U.S. Cl.
CPC ........... *H01R 13/111* (2013.01); *H01R 13/18* (2013.01)

(58) Field of Classification Search
None
See application file for complete search history.

(56) References Cited

U.S. PATENT DOCUMENTS 11,502,437 B2 * 11/2022 Brand .................. H01R 13/111

FOREIGN PATENT DOCUMENTS

| | | | |
|---|---|---|---|
| CN | 214849164 | U | 11/2021 |
| DE | 102013001836 | B3 | 3/2014 |
| FR | 1234270 | A | 10/1960 |
| JP | H10270110 | A | 10/1998 |

OTHER PUBLICATIONS

Machine translation of JP 10-270110, Japan Aviation, Sep. 10, 1998.*

Extended European Search Report dated Oct. 9, 2023, corresponding to Application No. 23174417.8-1201, 8 pages.

* cited by examiner

*Primary Examiner* — Ross N Gushi
(74) *Attorney, Agent, or Firm* — Barley Snyder

(57) ABSTRACT

An elastic terminal ferrule includes an annular body, a limit structure formed on the annular body, and a mating limit structure formed on the annular body for mating with the limit structure. When the annular body is in a natural state without radial expansion, the limit structure and the mating limit structure are spaced apart from each other in a circumferential direction. When the outer diameter of the annular body is expanded to a predetermined value, the limit structure and the mating limit structure abut against each other in the circumferential direction to prevent further radial expansion of the elastic terminal ferrule.

20 Claims, 7 Drawing Sheets

ELASTIC TERMINAL FERRULE, TERMINAL ASSEMBLY, AND CHARGING SEAT

CROSS-REFERENCE TO RELATED APPLICATION

This application claims the benefit of the filing date under 35 U.S.C. § 119(a)-(d) of Chinese Patent Application No. 202221257944.3, filed on May 24, 2022.

FIELD OF THE INVENTION

The present invention relates to an elastic terminal ferrule, a terminal assembly comprising the elastic terminal ferrule, and a charging seat comprising the terminal assembly.

BACKGROUND

In the prior art, a charging seat typically includes a housing and a charging terminal installed in the housing. The charging terminal has a cylindrical part suitable for mating with a mating terminal on a charging gun. In order to improve the electrical contact reliability, multiple axial extension slots are usually formed on the cylindrical part of the charging terminal to divide the cylindrical part into multiple elastic arms distributed in the circumferential direction. Multiple elastic arms can make electrical contact with the mating terminal inserted into the cylindrical part.

When the insertion posture of the mating terminal is incorrect, however, such as tilting, it can cause excessive deformation and yielding of the cylindrical part of the charging terminal in the radial direction. If yielding occurs, it will cause the charging terminal to fail and prevent reliable electrical contact with the mating terminal.

SUMMARY

An elastic terminal ferrule includes an annular body, a limit structure formed on the annular body, and a mating limit structure formed on the annular body for mating with the limit structure. When the annular body is in a natural state without radial expansion, the limit structure and the mating limit structure are spaced apart from each other in a circumferential direction. When the outer diameter of the annular body is expanded to a predetermined value, the limit structure and the mating limit structure abut against each other in the circumferential direction to prevent further radial expansion of the elastic terminal ferrule.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
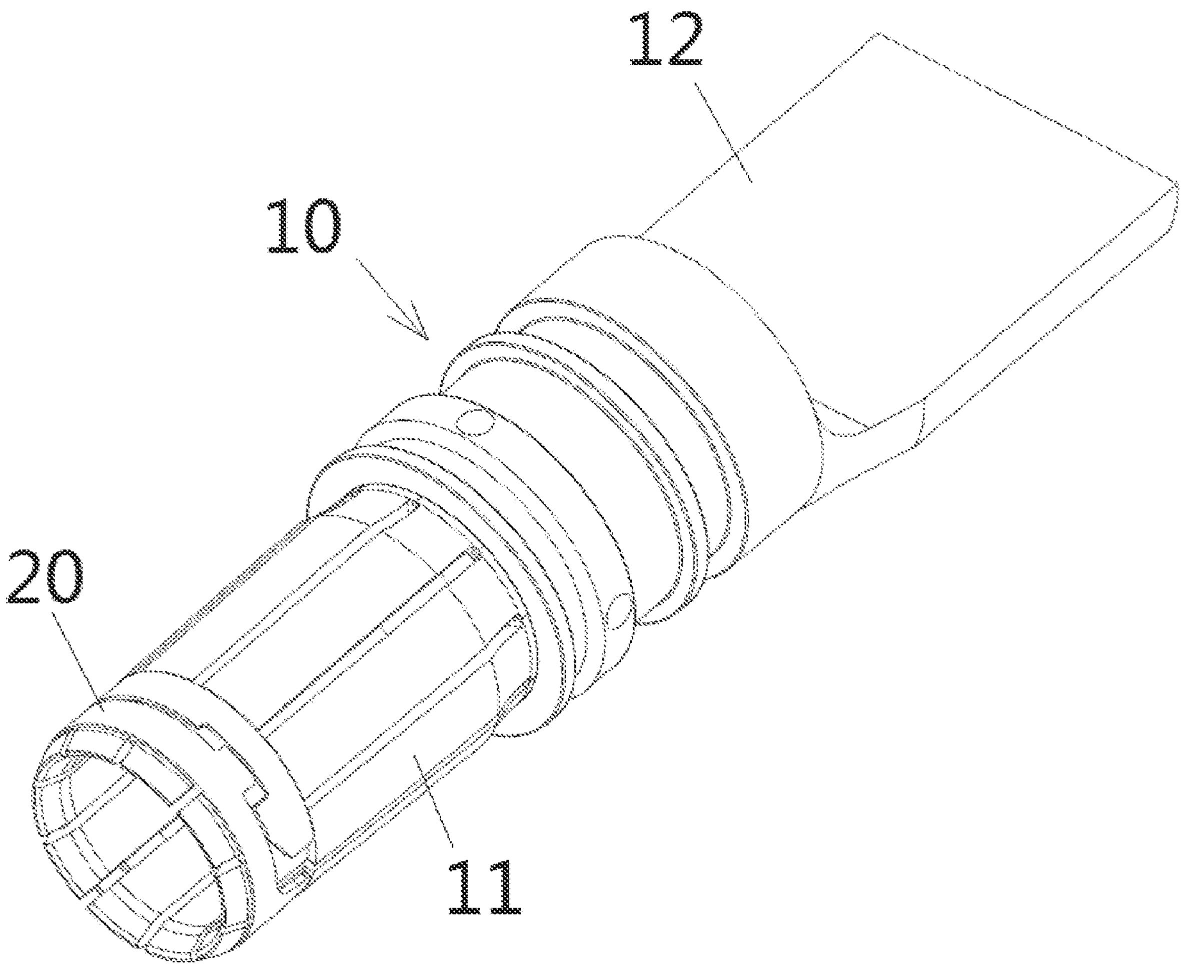
FIG. 1 is a perspective view of a terminal assembly according to an exemplary embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
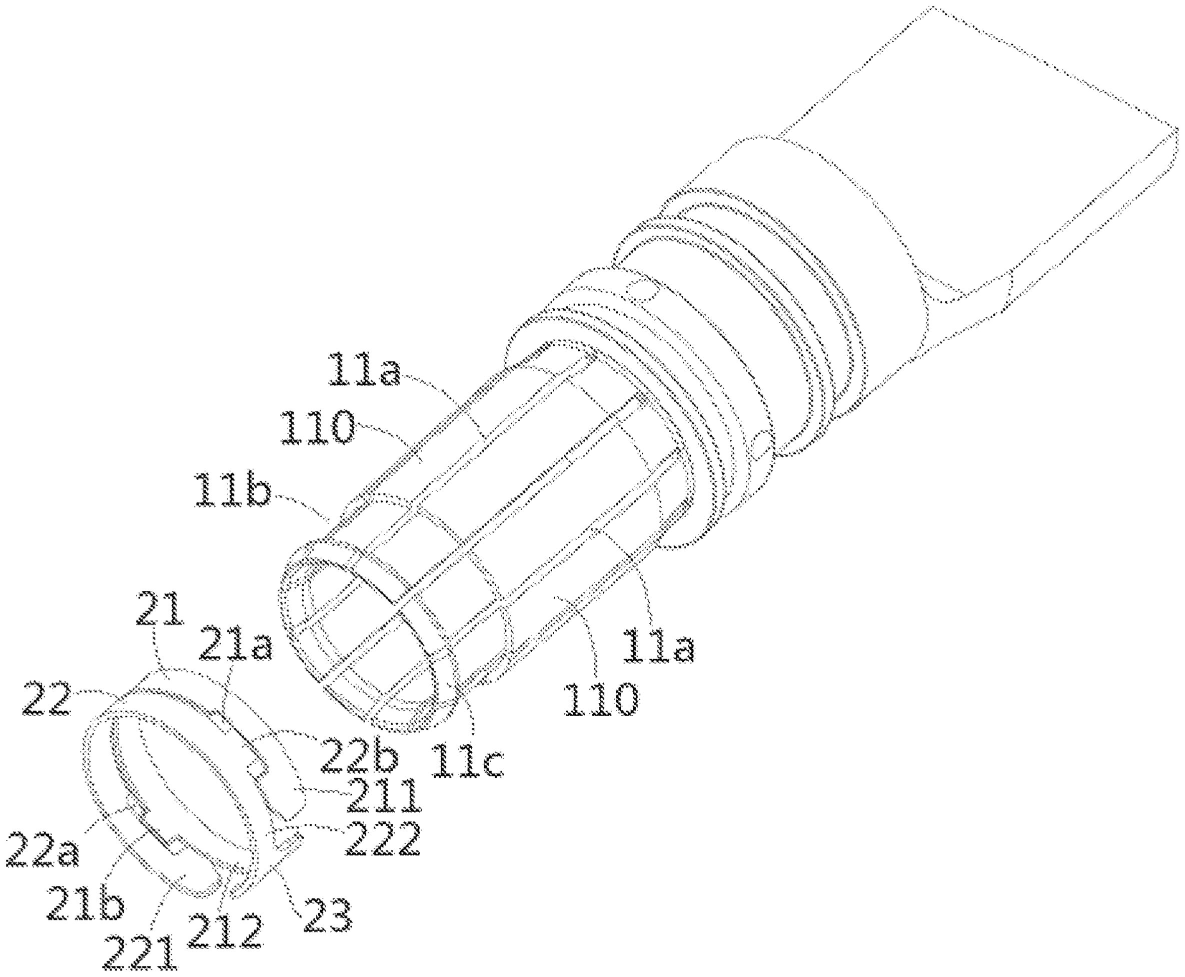
FIG. 2 is an exploded perspective view of a terminal assembly according to an exemplary embodiment.

As shown in FIGS. 1 and 2, in the illustrated embodiment, the terminal assembly includes a terminal 10 and an elastic terminal ferrule 20. Terminal 10 is located at one end of a cylindrical part 11 suitable for mating with a mating terminal. A plurality of axial extension slots 11*a* are formed on the cylindrical part 11. The elastic terminal ferrule 20 is installed on the outside of the cylindrical part 11 of the terminal 10 to prevent excessive expansion of the cylindrical part 11 in the radial direction. This can prevent yielding deformation of the cylindrical part 11 of terminal 10 and increase the service life of the terminal 10.

Figure 3:
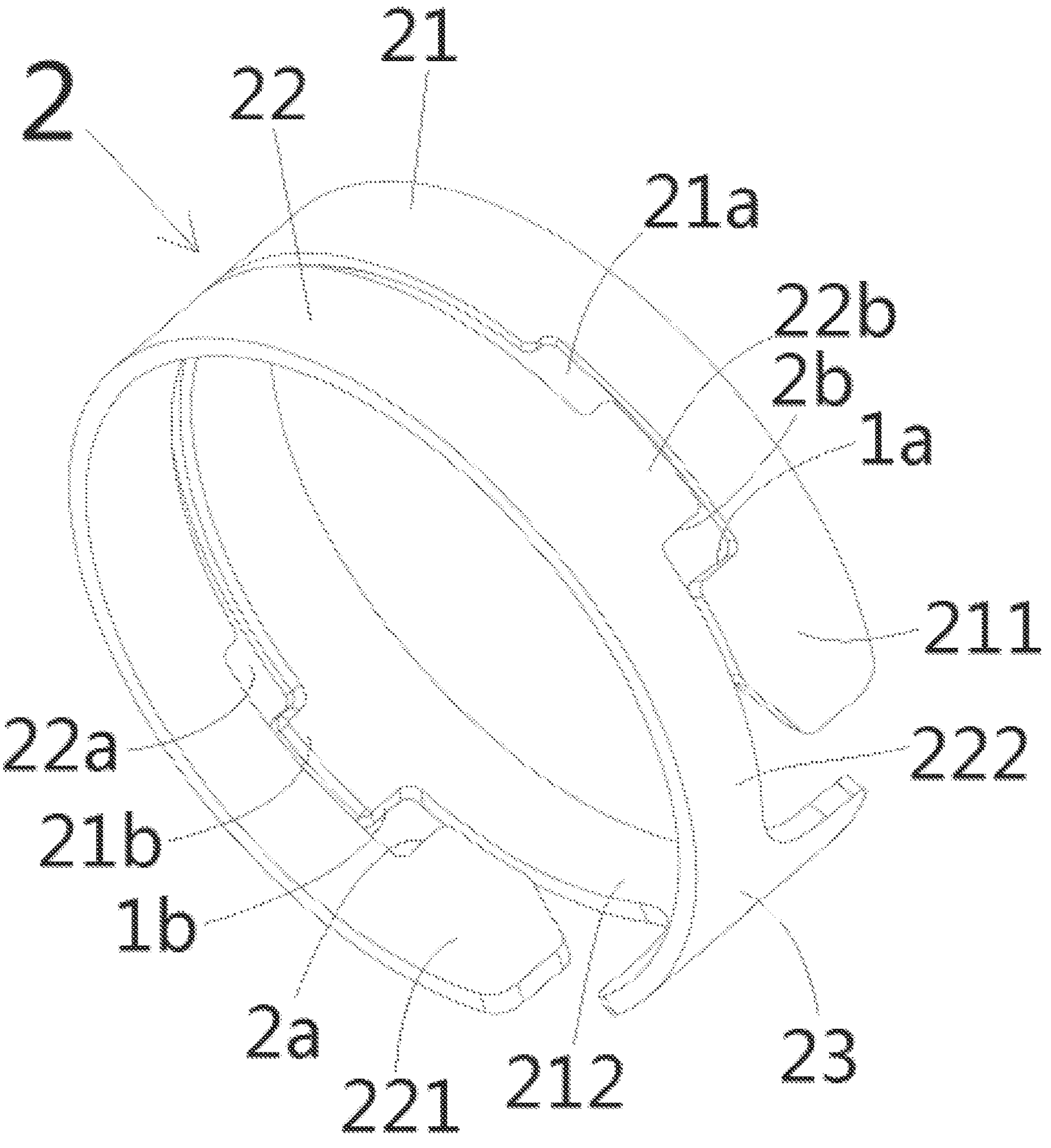
FIG. 3 is a perspective view of an elastic terminal ferrule of a terminal assembly according to an exemplary embodiment.

As shown in FIGS. 2 and 3, in the illustrated embodiment, the elastic terminal ferrule 20 includes an annular body 2. The annular body 2 has two ends 211 and 221. The two ends 211 and 221 are free in the circumferential direction of the annular body 2. The elastic terminal ferrule 20 also includes a limit structure 1*a*, 2*a* and a mating limit structure 1*b*, 2*b*. The limit structure 1*a* and 2*a* is formed on the annular body 2 and near the end 211, 221 of the annular body 2. The mating limit structure 1*b* and 2*b* is formed on the annular body 2 for coordination with the limit structure 1*a* and 2*a*.

As shown in FIG. 3, when the annular body 2 is in a free state that has not been radially expanded, the limit structure 1*a*, 2*a* and the mating limit structure 1*b*, 2*b* are spaced in the circumferential direction. That is, there is a certain spacing in the circumferential direction between the limit structure 21*a*, 22*a*, and the mating limit structure 1*b*, 2*b*, allowing the limit structure 1*a*, 2*a* and the mating limit structure 1*b*, 2*b* to move relative to each other within a certain range.

Figure 5:
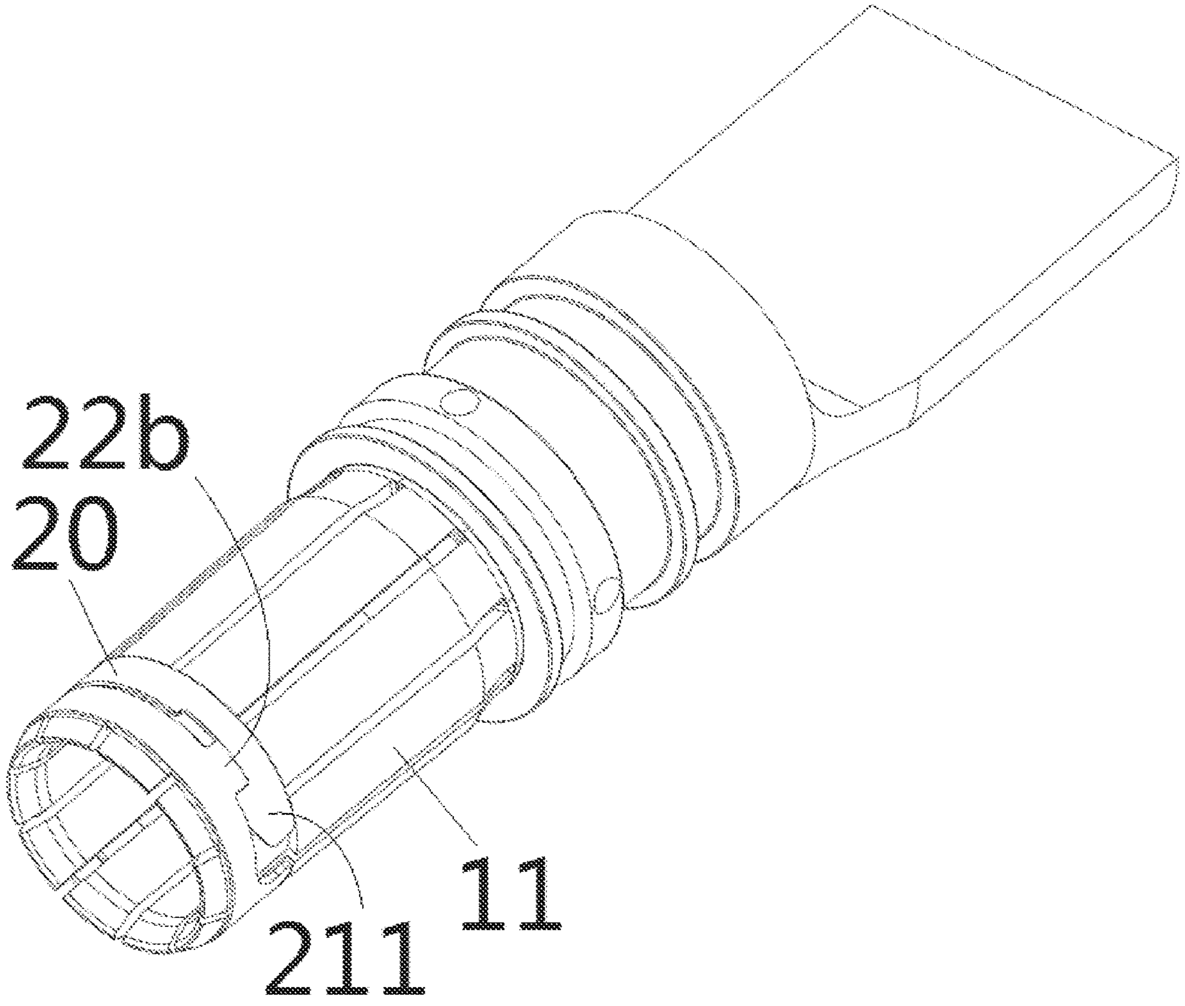
FIG. 5 is a perspective view of a terminal assembly when a mating terminal is inserted in an incorrect posture according to an exemplary embodiment.

When the outer diameter of the annular body 2 is expanded to a predetermined value, shown in FIG. 5, the limit structure 1*a*, 2*a* and the mating limit structure 1*b* and 2*b* are against each other in the circumferential direction to prevent further radial expansion of the elastic terminal ferrule 20.

As shown in FIGS. 2 and 3, the elastic terminal ferrule 20 includes a first ring 21 and a second ring 22. The first ring 21 has a first root 212 and a first end 211 that can move in the circumferential direction relative to the first root 212.

The second ring 22 is axially adjacent to the first ring 21 and connected to the first root 212 of the first ring 21. A notch 21*a* and 22*a* is formed on one of the two adjacent edges of the first ring 21 and the second ring 22, and a protrusion 21*b* and 22*b* is formed on the other of the two adjacent edges of the first ring 21 and the second ring 22 and axially protrudes into the notch 21*a* and 22*a*.

As shown in FIG. 5, when the mating terminal is inserted into the cylindrical part 11 of terminal 10 in an incorrect posture, for example, when inserted obliquely, the outer diameter of the elastic terminal ferrule 20 will be expanded to the predetermined value. When the outer diameter of the elastic terminal ferrule 20 is expanded to the predetermined value, the protrusion 21*b* and 22*b* is circumferential against the inner side of the notch 21*a* and 22*a* to prevent further radial expansion of the elastic terminal ferrule 20 and the cylindrical part 11 of the terminal 10. In this way, it is possible to prevent the cylindrical part 11 of the terminal 10 from being excessively expanded radially.

As shown in FIG. 3, a blocking surface 1*a* and 2*a* is formed on the inner side of notch 21*a* and 22*a*, which extends axially and radially. A mating blocking surface 1*b* and 2*b* is formed on the protrusion 21*b* and 22*b*, which extends axially and radially and is circumferential opposite to the blocking surface 1*a* and 2*a*. In the illustrated embodiment, the blocking surface 1*a* and 2*a* is served as the aforementioned limit structure, and the mating blocking surfaces 1*b* and 2*b* is served as the aforementioned mating limit structure.

When the outer diameter of the elastic terminal ferrule 20 is expanded to the predetermined value, the blocking surface 1*a* and 2*a* is circumferential against the mating blocking surface 1*b* and 2*b* to prevent further radial expansion of the elastic terminal ferrule 20 and the cylindrical part 11 of the terminal 10.

As shown in FIGS. 2 and 3, the second ring 22 has a second root 222 and a second end 221 that can move in the circumferential direction relative to the second root 222. The second root 222 of the second ring 22 is connected to the first root 212 of the first ring 21. The aforementioned notch 21*a* and 22*a* includes a first notch 21*a* formed on the periphery of the first ring 21 near the first end 211. The aforementioned protrusion 21*b* and 22*b* includes a first protrusion 22*b* formed on the periphery of the second ring 22 near the second root 222. When the outer diameter of the elastic terminal ferrule 20 is expanded to the predetermined value, the first protrusion 22*b* is circumferential against the inner side of the first notch 21*a* to prevent further radial expansion of the elastic terminal ferrule 20.

As shown in FIG. 3, a first blocking surface 1*a* is formed on the inner side of the first notch 21*a*, which extends axially and radially. A first mating blocking surface 2*b* is formed on the first protrusion 22*b*, which extend axially and radially and is circumferential opposite to the first blocking surface 1*a*. When the outer diameter of the elastic terminal ferrule 20 is expanded to the predetermined value, the first blocking surface 1*a* is circumferential against the first mating blocking surface 2*b* to prevent further radial expansion of the elastic terminal ferrule 20.

As shown in FIG. 3, the aforementioned notch 21*a* and 22*a* also includes a second notch 22*a* formed on the periphery of the second ring 22 near the second end 221. The aforementioned protrusion 21*b* and 22*b* also includes a second protrusion 21*b* formed on the periphery of the first ring 21 near the first root 212. When the outer diameter of the elastic terminal ferrule 20 is expanded to the predetermined value, the second protrusion 21*b* is circumferential against the inner side of the second notch 22*a* to prevent further radial expansion of the elastic terminal ferrule 20.

As shown in FIG. 3, a second blocking surface 2*a* is formed on the inner side of the second notch 22*a*, and the second blocking surface 2*a* extends axially and radially. A second mating blocking surface 1*b* is formed on the second protrusion 21*b*, and the second mating blocking surface 1*b* extends axially and radially and is circumferential opposite to the second blocking surface 2*a*. When the outer diameter of the elastic terminal ferrule 20 is expanded to the predetermined value, the second blocking surface 2*a* is circumferential against the second mating blocking surface 1*b* to prevent further radial expansion of the elastic terminal ferrule 20.

The elastic terminal ferrule 20, as shown in FIG. 3, also includes a connection portion 23, which connects the first root 212 of the first ring 21 and the second root 222 of the second ring 22.

The aforementioned elastic terminal ferrule 20 can be an integral stamping component formed by stamping a single sheet. This can reduce manufacturing costs.

As shown in FIG. 2, a positioning slot 11*b* is formed on the outer surface of the end of the cylindrical part 11 of the terminal 10, and the elastic terminal ferrule 20 is positioned in the positioning slot 11*b* to prevent axial movement of the elastic terminal ferrule 20.

When the outer diameter of the cylindrical part 11 of terminal 10 is expanded to a maximum allowable value, the protrusions 21*b* and 22*b* on the elastic terminal ferrule 20 are circumferential against the inner side of the notches 21*a* and 22*a* of the elastic terminal ferrule 20 to prevent further radial expansion of the elastic terminal ferrule 20 and the cylindrical part 11 of terminal 10. In this way, it is possible to prevent the outer diameter of the cylindrical part 11 of terminal 10 from expanding beyond its maximum allowable value, thereby ensuring that the cylindrical part 11 of terminal 10 will not undergo yield deformation.

Figure 4:
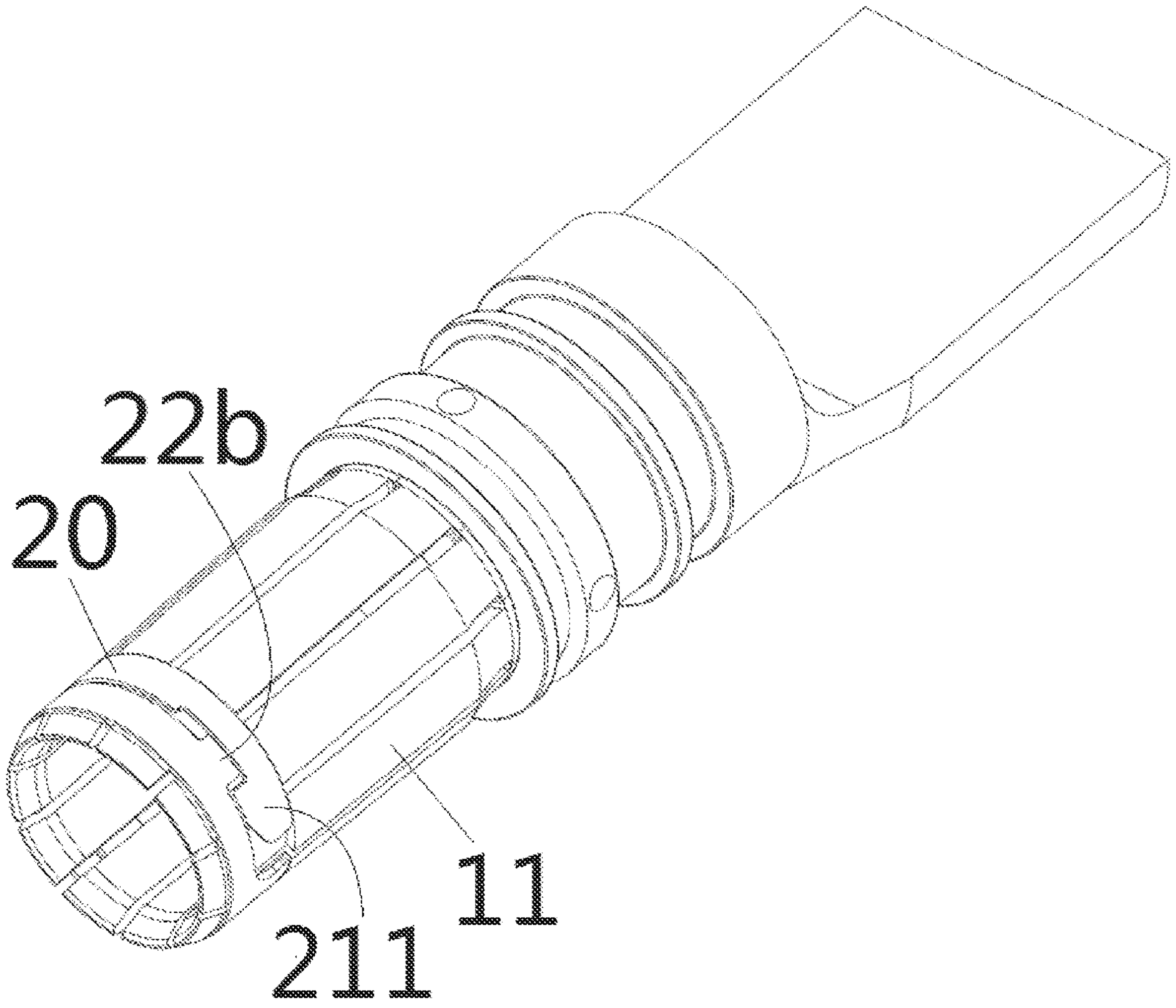
FIG. 4 is a perspective view of a terminal assembly when a mating terminal is inserted in a correct posture according to an exemplary embodiment.

As shown in FIG. 4, in the illustrated embodiment, when the mating terminal is inserted into the cylindrical part 11 of terminal 10 in the correct posture, the outer diameter of the cylindrical part 11 is expanded to a first value less than the maximum allowable value, and the outer diameter of the elastic terminal ferrule 20 is expanded to a second value less than the predetermined value. At this point, the aforementioned blocking surfaces 1*a*, 2*a*, and the aforementioned mating blocking surfaces 1*b*, 2*b* have not yet reached the position of contact with each other in the circumferential direction, that is, there is still a certain gap in the circumferential direction between the blocking surfaces 1*a*, 2*a*, and the mating blocking surfaces 1*b*, 2*b*.

When the elastic terminal ferrule 20 is in a natural state without radial expansion, as shown in FIG. 1, the outer diameter of the elastic terminal ferrule 20 is equal to an initial value. When the elastic terminal ferrule 20 is installed on the cylindrical part 11 and the mating terminal is not inserted into the cylindrical part 11, the outer diameter of the elastic terminal ferrule 20 is expanded to slightly greater than the initial value, in order to apply a predetermined radial tightening force on the cylindrical part 11.

A guiding slope 11*c*, shown in FIG. 2, is formed on the end of the cylindrical part 11 of terminal 1, which is used to guide the elastic terminal ferrule 20 to fit onto the cylindrical part 11 of terminal 1. A plurality of axial extension slots 11*a* on the cylindrical part 11 are evenly spaced in the circumferential direction and extend axially to the end face of the cylindrical part 11, thereby separating the cylindrical part 11 of terminal 1 into multiple elastic cantilevers 110.

As shown in FIG. 1, the terminal 10 also includes a flat end part 12 located at its other end. A conductor core of a cable can be welded to the flat end part 12 of terminal 10. However, the present invention is not limited to this, and the flat end part 12 of terminal 10 can also be riveted or otherwise attached to the conductor core of the cable.

Figure 6:
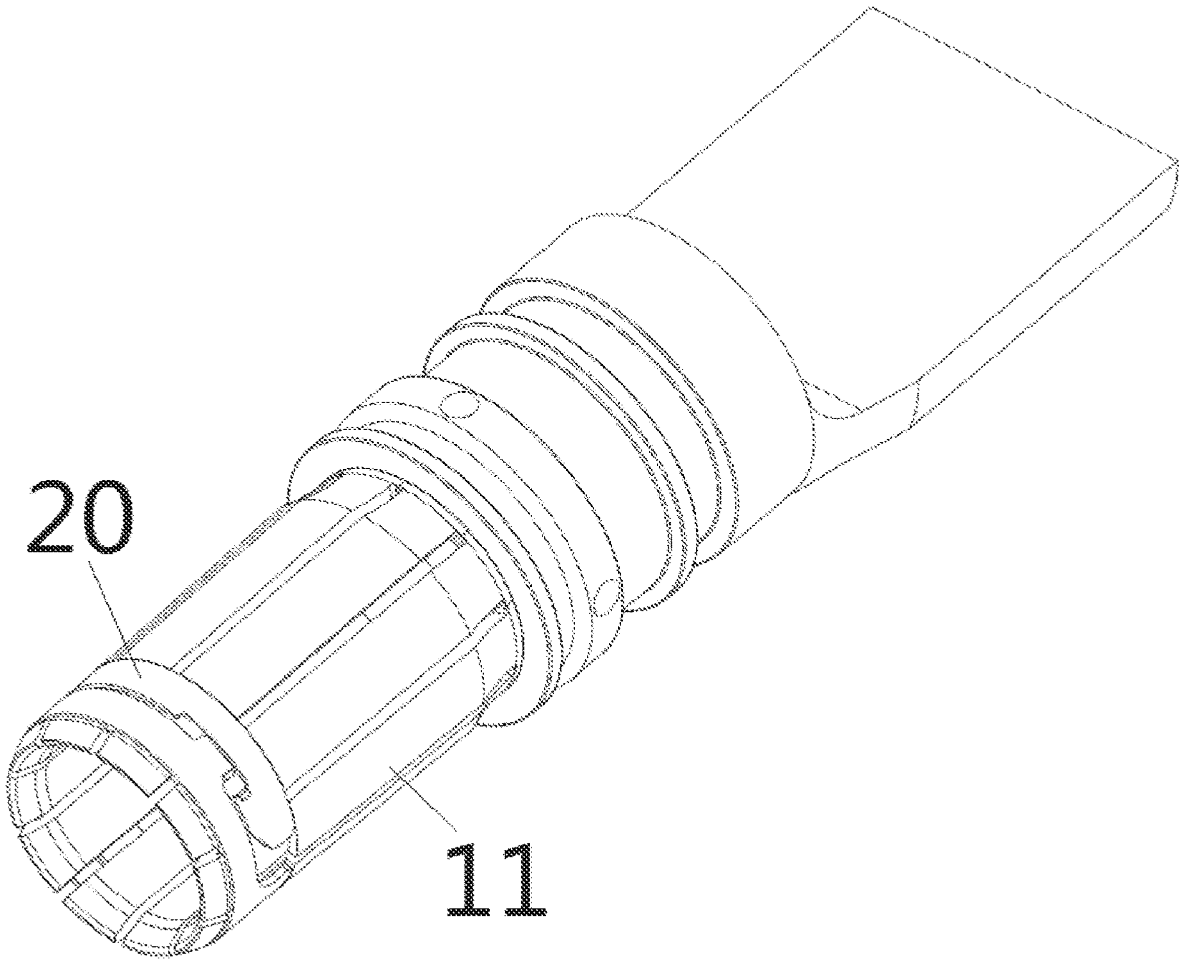
FIG. 6 is a perspective view of a terminal assembly according to another exemplary embodiment.
Figure 7:
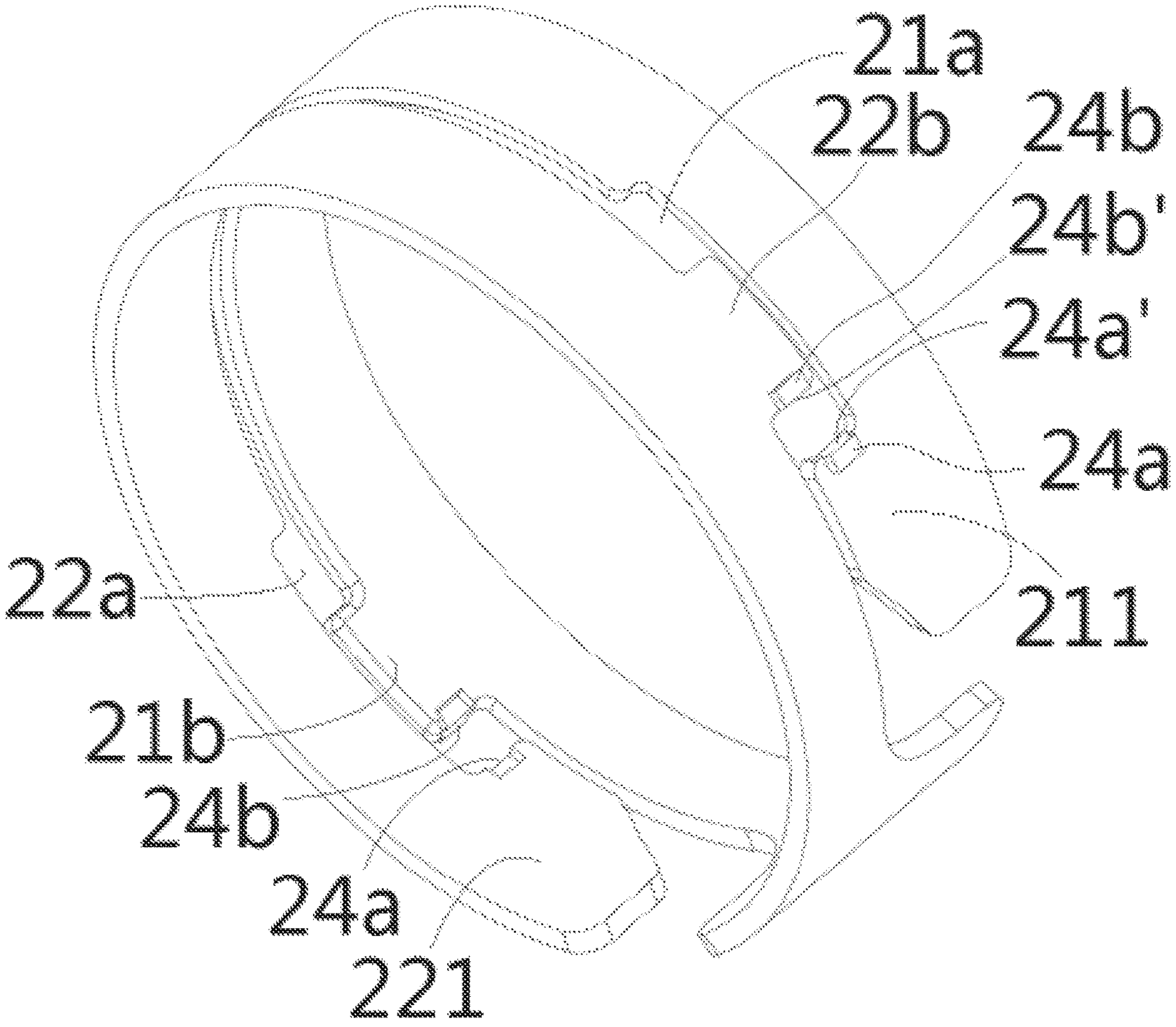
FIG. 7 is a perspective view of an elastic terminal ferrule of the terminal assembly shown in FIG. 6.

FIG. 6 shows an illustrative assembly view of a terminal assembly according to another exemplary embodiment of the present invention. FIG. 7 shows an illustrative perspective view of the elastic terminal ferrule 20 of the terminal assembly shown in FIG. 6. The difference between the terminal assembly shown in FIGS. 6 and 7 and those shown in FIGS. 1 to 5 is only in the structure of the elastic terminal ferrule 20 to prevent excessive radial expansion.

As shown in FIG. 7, a first radial protrusion 24*a* and a second radial protrusion 24*b* are formed on two sides of the notch 21*a*, 22*a*, and the protrusions 21*b* and 22*b* facing each other in the circumferential direction, respectively. The first radial protrusion 24*a* and the second radial protrusion 24*b* can be formed by stamping. When the outer diameter of the elastic terminal ferrule 20 is expanded to the predetermined value, the first radial protrusion 24*a* circumferentially abuts against the second radial protrusion 24*b* to prevent further radial expansion of the elastic terminal ferrule 20.

Due to the predetermined height of the first radial protrusion 24*a* and the second radial protrusion 24*b* radially protruding from the outer surface of the elastic terminal ferrule 20, when subjected to excessive radial expansion tension, the first radial protrusion 24*a* of the elastic terminal ferrule 10 will also reliably rest against the second radial protrusion 24*b*, without crossing the second radial protrusion 24*b* in the circumferential direction.

As shown in FIG. 7, a blocking surface 24*a*' is formed on the first radial protrusion 24*a*, and the blocking surface 24*a*' extends axially and radially. A mating blocking surface 24*b*' is formed on the second radial protrusion 24*b*, which extends axially and radially and is opposite to the blocking surface 24*a*' in the circumferential direction. When the outer diameter of the elastic terminal ferrule 20 is expanded to the predetermined value, the blocking surface 24*a*' will be circumferential against the mating blocking surface 24*b*' to prevent further radial expansion of the elastic terminal ferrule 20.

Except for the aforementioned differences, the other features of the elastic terminal ferrule 20 shown in FIGS. 6 and 7 are basically the same as those shown in FIGS. 1 to 5. For the sake of simplicity, it will not be repeated here, and reference can be made to the elastic terminal ferrule 20 shown in FIGS. 1 to 5.

In an exemplary embodiment of the present invention, a charging seat is also disclosed. The charging seat includes a housing and the aforementioned terminal assembly, which is installed in the housing. The terminal in the terminal assembly can be a charging terminal.

In the illustrated embodiments, the annular body 2 of the elastic terminal ferrule 20 has two rings 21 and 22. However, the present invention is not limited to the illustrated embodiments, for example, the annular body 2 of the elastic terminal ferrule 20 may also have a single ring.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An elastic terminal ferrule, comprising:

an annular body having a pair of ends which are free in a circumferential direction of the annular body;

a limit structure formed on the annular body near one of the ends of the annular body; and a mating limit structure formed on the annular body for mating with the limit structure, the limit structure and the mating limit structure are spaced apart from each other in the circumferential direction when the annular body is in a natural state without radial expansion, and the limit structure and the mating limit structure abut against each other in the circumferential direction to prevent further radial expansion of the elastic terminal ferrule when an outer diameter of the annular body is expanded to a predetermined value, the annular body includes a first ring and a second ring, the first ring has a first root and a first end movable in the circumferential direction relative to the first root, the second ring is axially adjacent to the first ring and connected to the first root.

2. The elastic terminal ferrule according to claim 1, wherein the elastic terminal ferrule is an integral stamping component formed by stamping a single sheet.

3. The elastic terminal ferrule according to claim 1, wherein the limit structure is formed on one of a pair of adjacent edges of the first ring and the second ring, the mating limit structure is formed on the other of the pair of adjacent edges of the first ring and the second ring.

4. The elastic terminal ferrule according to claim 3, wherein a notch is formed on one of the pair of adjacent edges of the first ring and the second ring, a protrusion is formed on the other of the pair of adjacent edges of the first ring and the second ring and protrudes axially into the notch, a blocking surface is formed on an inner side of the notch as the limit structure, the blocking surface extends axially and radially, a mating blocking surface is formed on the protrusion as the mating limit structure, the mating blocking surface extends axially and radially and is opposite to the blocking surface in the circumferential direction, the blocking surface circumferentially abuts against the mating blocking surface to prevent further radial expansion of the elastic terminal ferrule when the outer diameter of the elastic terminal ferrule is expanded to the predetermined value.

5. The elastic terminal ferrule according to claim 4, wherein a first radial protrusion and a second radial protrusion are formed on a pair of sides of the notch and the protrusion, respectively, and face each other in the circumferential direction, the first radial protrusion circumferentially abuts against the second radial protrusion to prevent further radial expansion of the elastic terminal ferrule when the outer diameter of the elastic terminal ferrule is expanded to the predetermined value.

6. The elastic terminal ferrule according to claim 5, wherein a blocking surface is formed on the first radial protrusion, the blocking surface extends axially and radially, a mating blocking surface is formed on the second radial protrusion, the mating blocking surface extends axially and radially and is opposite to the blocking surface in the circumferential direction, the blocking surface circumferentially abuts against the mating blocking surface to prevent further radial expansion of the elastic terminal ferrule when the outer diameter of the elastic terminal ferrule is expanded to the predetermined value.

7. The elastic terminal ferrule according to claim 4, wherein the second ring has a second root and a second end which is movable in the circumferential direction relative to the second root, the second root of the second ring is connected to the first root of the first ring.

8. The elastic terminal ferrule according to claim 7, further comprising a connection part connecting the first root of the first ring and the second root of the second ring.

9. The elastic terminal ferrule according to claim 7, wherein the notch includes a first notch formed on a periphery of the first ring near the first end, the protrusion includes a first protrusion formed on a periphery of the second ring near the second root, the first protrusion circumferentially abuts against an inner side of the first notch to prevent further radial expansion of the elastic terminal ferrule when the outer diameter of the elastic terminal ferrule is expanded to the predetermined value.

10. The elastic terminal ferrule according to claim 9, wherein the blocking surface includes a first blocking surface formed on the inner side of the first notch, the first blocking surface extends axially and radially, the mating blocking surface includes a first mating blocking surface formed on the first protrusion, the first mating blocking surface extends axially and radially and is opposite to the first blocking surface in the circumferential direction, the first blocking surface circumferentially abuts against the first mating blocking surface to prevent further radial expansion of the elastic terminal ferrule when the outer diameter of the elastic terminal ferrule is expanded to the predetermined value.

11. The elastic terminal ferrule according to claim 9, wherein the notch includes a second notch formed on the periphery of the second ring near the second end, the protrusion includes a second protrusion formed on the periphery of the first ring near the first root, the second protrusion circumferentially abuts against an inner side of the second notch to prevent further radial expansion of the elastic terminal ferrule when the outer diameter of the elastic terminal ferrule is expanded to a predetermined value.

12. The elastic terminal ferrule according to claim 11, wherein the blocking surface includes a second blocking surface formed on the inner side of the second notch, the second blocking surface extends axially and radially, the mating blocking surface includes a second mating blocking surface formed on the second protrusion, the second mating blocking surface extends axially and radially and is opposite to the second blocking surface in the circumferential direction, the second blocking surface circumferentially abuts against the second mating blocking surface to prevent further radial expansion of the elastic terminal ferrule when the outer diameter of the elastic terminal ferrule is expanded to the predetermined value.

13. A terminal assembly, comprising:

a terminal having a cylindrical part located at an end and adapted to mate with a mating terminal, a plurality of axial extension slots are formed on the cylindrical part; and an elastic terminal ferrule sleeved on an outside of the cylindrical part of the terminal to prevent the cylindrical part from being excessively expanded radially, the elastic terminal ferrule includes:

an annular body having a pair of ends which are free in a circumferential direction of the annular body;

a limit structure formed on the annular body near one of the ends of the annular body; and a mating limit structure formed on the annular body for mating with the limit structure, the limit structure and the mating limit structure are spaced apart from each other in the circumferential direction when the annular body is in a natural state without radial expansion, and the limit structure and the mating limit structure abut against each other in the circumferential direction to prevent further radial expansion of the elastic terminal ferrule when an outer diameter of the annular body is expanded to a predetermined value, the annular body includes a first ring and a second ring, the first ring has a first root and a first end movable in the circumferential direction relative to the first root, the second ring is axially adjacent to the first ring and connected to the first root.

14. The terminal assembly according to claim 13, wherein a positioning slot is formed on an end of the cylindrical part, the elastic terminal ferrule is positioned in the positioning slot to prevent axial movement of the elastic terminal ferrule.

15. The terminal assembly according to claim 13, wherein a protrusion on the elastic terminal ferrule circumferentially abuts against an inner side of a notch of the elastic terminal ferrule to prevent further radial expansion of the elastic terminal ferrule and the cylindrical part of the terminal when the outer diameter of the cylindrical part is expanded to a maximum allowable value.

16. The terminal assembly according to claim 15, wherein, when the mating terminal is inserted into the cylindrical part of the terminal in a correct posture, the outer diameter of the cylindrical part is expanded to a first value less than the maximum allowable value, and the outer diameter of the elastic terminal ferrule is expanded to a second value less than the predetermined value.

17. The terminal assembly according to claim 13, wherein, when the elastic terminal ferrule is in a natural state without radial expansion, the outer diameter of the elastic terminal ferrule is equal to an initial value, and when the elastic terminal ferrule is sleeved onto the cylindrical part and the mating terminal is not inserted into the cylindrical part, the outer diameter of the elastic terminal ferrule is expanded to slightly greater than the initial value, applying a predetermined radial tightening force on the cylindrical part.

18. The terminal assembly according to claim 13, wherein a guiding slope is formed on the end of the cylindrical part of the terminal to guide the elastic terminal ferrule to fit onto the cylindrical part of the terminal.

19. The terminal assembly according to claim 13, wherein the plurality of axial extension slots are evenly spaced in the circumferential direction and extend along an axial direction to an end face of the cylindrical part, dividing the cylindrical part of the terminal into a plurality of elastic cantilevers.

20. A charging seat, comprising:

a housing; and the terminal assembly according to claim 13 installed in the housing.

* * * * *